Nov. 9, 1926. 1,606,150
T. S. CURTIS
REFRACTORY WALL OR STRUCTURE
Filed Nov. 3, 1924  2 Sheets-Sheet 1
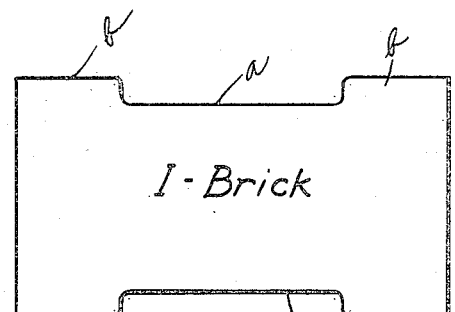
FIG. 1 — I-Brick
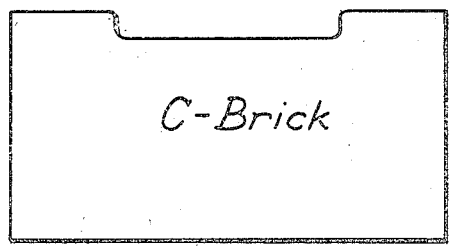
FIG. 2 — C-Brick
FIG. 3 — I-Soap
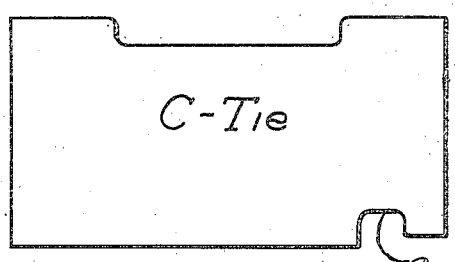
FIG. 4 — C-Tie
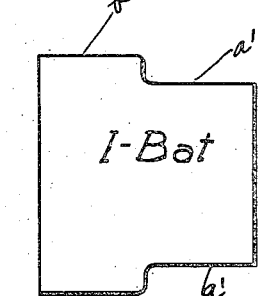
FIG. 5 — I-Bat
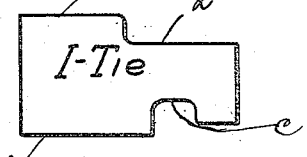
FIG. 6 — I-Tie
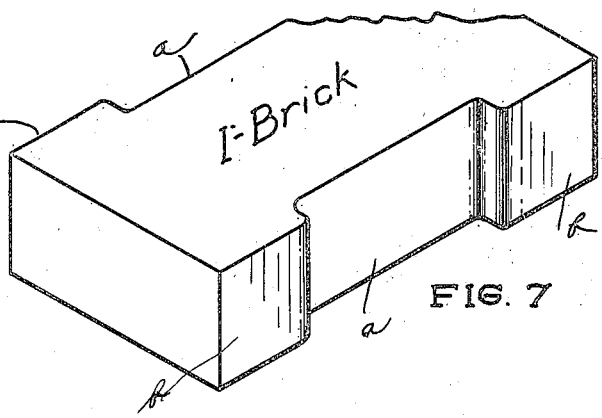
FIG. 7 — I-Brick
INVENTOR
T. S. Curtis
BY
ATTORNEYS.

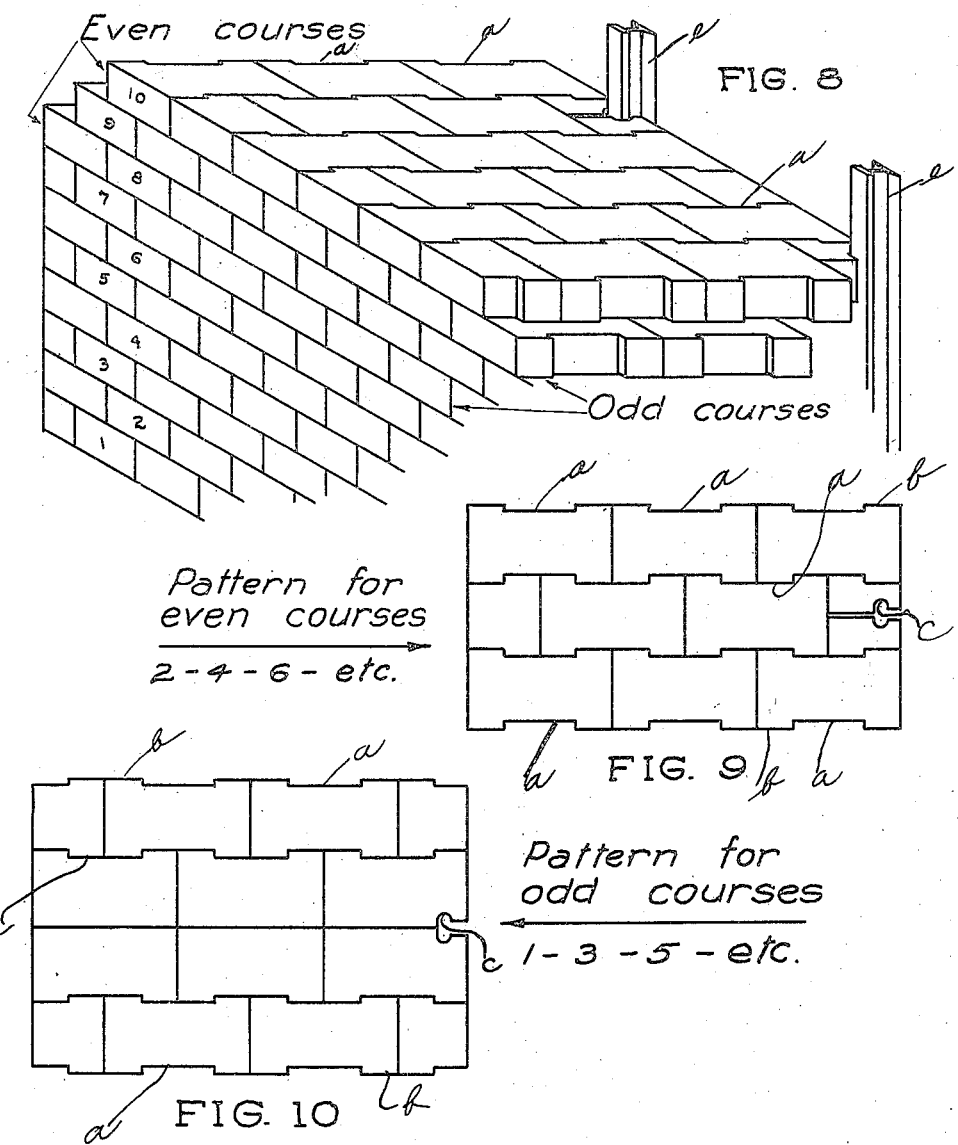

Patented Nov. 9, 1926.

1,606,150

UNITED STATES PATENT OFFICE.

THOMAS S. CURTIS, OF HUNTINGTON PARK, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA.

REFRACTORY WALL OR STRUCTURE.

Application filed November 3, 1924. Serial No. 747,621.

This invention has to do with refractory linings or walls such as used in high temperature furnace constructions, though the invention is susceptible of adaptation to other uses where brick work is subjected to the action of high melting temperatures. I have in mind in the latter connection, as an instance, the employment of this invention for the purposes of a refractory covering on a tunnel ceramic kiln car. The term "wall," therefore, as used herein is contemplated to be employed in a rather broad sense, in that my invention is not limited to vertical wall structures. In the designing of the present invention, I have recognized and corrected the tendency of walls or structures made up of refractory bricks, to crawl, bend and lean in the direction of the high temperature zone of the furnace.

The above action or actions result in the development of large cracks or openings in the refractory structure so that the ultimate effects of flame erosion become manifest a considerable period of time before the whole refractory structure has had a reasonable period of usage.

My method of correcting the tendencies above mentioned contemplates the employment of a refractory wall or structure, whatever its function may be, by utilizing a continuous mechanical bond or interlock between the inner face of the structure and the outer face, or between the inner face of a furnace wall and the exterior construction of a furnace.

To the above end I provide bricks or shapes of refractory substance, effecting the advantageous continuous interlocking or mechanical bond previously referred to, but so made as to allow for expansion of the structure in both vertical and horizontal planes.

In the carrying out of my invention, there is involved the principle of using superposed courses of bricks or shapes, each brick having interlocking elements, the bricks or shapes of one course embodying the same principle of interlocking as those of a superposed course, but being slightly differently formed so as to prevent registration of the joints between the bricks or shapes of one course and those of the bricks or shapes of the next adjacent course.

With the foregoing in view, reference may be had to the annexed drawings for a full understanding of the invention, and the advantages of its use, and in said drawings, Fig. 1 is a plan view of a brick or shape of one form which I use in my refractory structure or wall.

Fig. 2 is a similar view of a different form of brick.

Fig. 3 is a similar view of a brick or shape such as used at the outside or inside of the wall or structure in order to give a smooth final surface.

Fig. 4 is a brick similar to Fig. 2, except that it is formed with a rail engaging notch.

Fig. 5 is a half brick of the general design of Fig. 1.

Fig. 6 is a special half tie brick equipped with the rail engaging notch, and a brick interlocking notch.

Fig. 7 is a perspective view of the style shown in Fig. 1, but partly broken away at the corner.

Fig. 8 is a perspective view of a furnace structure embodying the invention, and illustrating more particularly the odd and even courses of the bricks, which are assembled somewhat differently; also showing the interlocking features.

Fig. 9 is an illustration of the mode of assemblage of the several bricks or shapes, including whole bricks, half bricks, and the rail interlocking bricks of the assembly employed preferably for the even courses.

Fig. 10 is a view similar to Fig. 9, but showing the assemblage of bricks and their structures as employed preferably for the odd courses.

It will be understood that the expressions "odd" and "even" in respect to the courses of bricks as presented hereinafter, are purely relative expressions. In the carrying out of the invention, the shapes and assemblage of bricks for the lowest course, which is the odd course, might be either of those which are fully presented hereinafter. I use the two assemblages, as previously indicated, to avoid registration of the joints, and it suffices if the two types of courses alternate, there being no practical advantage in using either one as the bottom course.

The forms of the bricks or shapes employed by me are such as to provide interlocking elements preferably at opposite sides of the bricks, the principle of the interlocking construction being carried through in respect to practically all of the shapes which I employ.

Referring to Fig. 1, it is evident that the brick is provided at opposite sides with large recesses $a$, forming end projections $b$. This brick is designated "I-brick," having a general I form.

The brick of Fig. 3 is practically a half brick, like the brick of Fig. 1, and is designated "I-soap", having at one side thereof the recess $a$ and projections $b$, the opposite side being smooth.

The brick of Fig. 5 is a half brick, useful, of course, for the usual purposes for which half bricks are employed in wall construction. This brick of Fig. 5 is designated as "I-bat" and has the opposite side projections $b$ and the opposite half recesses $a'$.

The brick of Fig. 6 is a special shape, being practically a quarter brick used for tie purposes primarily, and it is designated "I-tie", has the opposite projections $b$, one slightly longer than the other, and is notched at $c$ to engage with a standard 20-lb. mine car rail such as is usually clipped to the shell of the boiler setting of a furnace with typical boiler wall construction. Opposite the notch $c$ is a half recess $a''$, which functions as the recess $a$ and $a'$, primarily.

The shapes or bricks illustrated in Figs. 1, 3, 5, 6 and 7 are employed in one course of the wall or other structure, the brick illustrated in Figs. 1 and 5 being, however, employed pretty generally in all courses.

In Figs. 2 and 4 I show special shapes or bricks designed for courses other than those in which the bricks or shapes of Figs. 3 and 6 are employed. The brick of Fig. 2 is practically like that of Fig. 3, except thicker, and is designated as "C-brick."

The brick of Fig. 4 is very similar to the brick of Fig. 2, except that it is notched at $c$ for the same purposes as the brick of Fig. 6. The brick of Fig. 4 is designated "C-tie." The special shapes of Figs. 2 and 4 are primarily used in the construction of the odd courses as illustrated in Fig. 10, the bricks of Fig. 2 having their smooth sides disposed adjacent when arranged, as indicated in the center part of the illustration of Fig. 10.

As appears from Figs. 8 to 10 inclusive, the bricks or shapes "C-tie" and "I-tie" interlock with the mine car rails designated $e$, and likewise they interlock with "I-bricks" of the construction shown in Fig. 1. By reason of the size of the bricks shown in Fig. 2 and the utilization of two rows of such bricks above a single row of the "I-bricks" of Fig. 1, (see Fig. 10), the vertical joints of the bricks of superimposed or adjacent courses will be broken. At the same time, however, a continuous interlock or bond between the bricks running from the external surface of the wall or structure to the internal surface, is used. Furthermore, the courses of bricks are, of course, interlocked mechanically with the mine car rails $e$, which virtually form vertical standards where the structure is like that shown in Fig. 8, in which a boiler wall of a common type is depicted.

The use of my invention with the bricks or shapes in horizontal positions, takes place when I employ the construction as a refractory covering on a ceramic kiln car. In such cars considerable difficulty is experienced with the refractory structure because the large blocks have a tendency to crack, and the standard brick employed tends to crawl and open up. Early disintegration of the brick work or refractory structure at comparatively low temperatures such as have little or no melting influence on the refractories, is the result. In the use of my invention the interlocking bricks or shapes may be applied with quite a little advantage by disposing the shapes in flat courses, somewhat as illustrated in Fig. 8, and building up the complete structure from the cast iron bottom to the working top of the car by the use of the interlocked bricks. Such construction has been found to prevent the car top brick from crawling and dropping off, even though they are subjected to many and repeated firing cycles. In Fig. 8 the superposed courses of bricks are designated by numerals from 1 to 10 inclusive. The odd courses, which are those designated by the odd numbers from the bottom, are built or assembled according to the arrangement of bricks shown in Fig. 10, while the even courses, those having the even numbers, are assembled of bricks arranged as illustrated in Fig. 9.

It will be evident upon reference to Figures 9 and 10 that one course of bricks two middle rows and two upper rows at opposite sides of the middle rows, the adjacent course comprising three rows, considering these assemblages as units, for the purpose of obtaining a break joint arrangement. Of course, a wall or structure, in accordance with the invention, would comprise many such units, ordinarily.

It is furthermore to be understood that the uses to which my invention may be put, as herein set forth, are merely illustrative, because structures of refractory bricks, in accordance with the invention, may take many different forms by way of vertical and horizontal, or other arrangements of the bricks or shapes hereinbefore characterized.

Having thus described my invention what I claim as new and desire to cover by Letters Patent, is,—

1. A refractory structure comprising an assemblage of rows of bricks arranged to provide a furnace having inner and outer sides, the inner side adapted to receive directly thereon the heat effects produced when the furnace is in operation; providing spaced off-standing projections, and the bricks of one row having their recesses disposed so as to receive the projections of the bricks of an adjacent row, the rows of bricks extending from the inner to the outer sides of the structure.

2. A refractory wall for high temperature furnaces, comprising adjacent courses of bricks forming a wall structure one side of which is adapted to be subjected to high melting temperatures, the bricks of each course being mechanically bonded to one another in a direction extending away from the side subjected to heat by interlock with the bricks of the contiguous rows of bricks of the same course.

3. A structure substantially as described, comprising rows of bricks assembled to provide a course of bricks or shapes disposed in one plane, the bricks of the said rows being interlocked at the sides thereof, and mine car rails passing through and interlocked with certain of the bricks and forming anchoring standards.

4. A refractory wall for high temperature furnaces, comprising adjacent courses of bricks forming a wall structure one side of which is adapted to be subjected to high melting temperatures, the bricks of each course being mechanically bonded to one another in a direction extending away from the side subjected to heat, and anchoring means passing through the courses of the bricks at the side opposite that subjected to the heat and anchoring the whole wall through the mechanical bonding together of the bricks of the courses.

5. A refractory structure substantially as described, comprising adjacent courses of bricks, the bricks of one course consisting of two inner rows of bricks, which have adjacent smooth sides, and two outer rows of bricks at opposite sides of the two inner rows, formed with recesses and projections at sides thereof, the outer sides of the bricks of the two inner rows of bricks having recesses and projections to interlock with those of the bricks of the two outer rows, the bricks of the other course comprising three rows disposed upon the bricks of the first mentioned course, the bricks of said three rows of bricks of the second course having interlocking recesses and projections at their adjacent sides, the middle row of bricks of the second course being of less width than the width of the two center rows of bricks of the first course, whereby the bricks of the two adjacent courses break joint.

6. A refractory structure substantially as described, comprising adjacent courses of bricks, the bricks of one course consisting of two inner rows of bricks which have adjacent smooth sides, and two outer rows of bricks at opposite sides of the two inner rows, formed with recesses and projections at sides thereof, the outer sides of the bricks of the two inner rows of bricks having recesses and projections to interlock with those of the bricks of the two outer rows, the bricks of the other course comprising three rows disposed upon the bricks of the first mentioned course, the bricks of said three rows of bricks of the second course having interlocking recesses and projections at their adjacent sides, the middle row of bricks of the second course being of less width than the width of the two center rows of bricks of the first course, whereby the bricks of the two adjacent courses break joint, and the bricks of the middle two rows of the first course being all long bricks, while the bricks of the middle row of the second course comprise long bricks and half length bricks, thus creating an additional break joint arrangement of the bricks of the middle rows of the first course in relation to the bricks of the middle row of the second course.

7. A refractory structure substantially as described, comprising adjacent courses of bricks, the bricks of one course consisting of two inner rows of bricks, which have adjacent smooth sides, and two outer rows of bricks at opposite sides of the two inner rows, formed with recesses and projections at sides thereof, the outer sides of the bricks of the two inner rows of bricks having recesses or projections to interlock with those of the bricks of the two outer rows, the bricks of the other course comprising three rows disposed upon the bricks of the first mentioned course, the bricks of said three rows of bricks of the second course having interlocking recesses and projections at their adjacent sides, the middle row of bricks of the second course being of less width than the width of the two center rows of bricks of the first course, whereby the bricks of the two adjacent courses break joint, and standards passing through and interlocking with the middle row or rows of bricks of the two courses.

8. A refractory structure as described, comprising a course of bricks made up of two middle rows, the bricks of which have adjacent smooth sides, and two outer rows of bricks at opposite sides of the middle rows, the sides of the bricks of the outer rows adjacent to the middle rows having lateral recesses and projections interlocking them with the bricks of the middle rows, and a standard extending into and having mechanical interlocking connections with the bricks of the middle rows to anchor same.

9. A refractory structure as described, comprising a course of bricks made up of two middle rows, the bricks of which have adjacent smooth sides, and two outer rows of bricks at opposite sides of the middle rows, the sides of the bricks of the outer rows adjacent the middle rows having lateral recesses and projections interlocking them with the bricks of the middle rows, and a standard having mechanical interlocking connection with the bricks of the middle rows, said mechanical interlocking connection being established by the provision of recesses at the ends of certain bricks of the midle rows which recesses receive and interlock with the standard, the standard being interlocked to the outer rows of bricks by means of their interlocking connections with the middle rows of bricks.

10. A refractory structure for high temperature furnaces and like uses substantially as described, comprising superposed courses of bricks arranged to provide a thick fire resistant wall to receive at its inner side the heating effects produced in a furnace, the bricks of each course having interlocking projections and recesses at the sides thereof, whereby they are mechanically bonded together, and means to prevent bending or leaning of the structure comprising vertical anchored standards passing through certain bricks of the structure whereby said standards are interlocked in the composite wall structure.

11. A refractory structure for high temperature furnaces and like uses substantially as described, comprising superposed courses of bricks arranged to provide a thick fire resistant wall to receive at its inner side the heating effects produced in a furnace, the bricks of each course disposed in rows running from the inner heat receiving side of the wall to its outer side and having interlocking projections and recesses at the sides thereof, whereby they are mechanically bonded together, the bricks of each course being so disposed that they break joint with the bricks of the other course and means to prevent bending or leaning of the structure comprising vertical standards extending through recesses in and interlocked with certain bricks of each course adjacent to the outer side of the structure.

12. A refractory wall for high temperature furnaces, or like structures, the same consisting of an assemblage of refractory bricks mechanically interlocked together from the inner to the outer sides of the wall, and a fixed standard made of a substance of relatively high heat conductivity interlocked with the bricks adjacent to the outer side of the wall, and thereby interlocked to all of the wall structure, whereby leaning or bending of the wall in the direction of the high temperature zone of the furnace is prevented.

13. A refractory wall for high temperature furnaces, or like structures, the same consisting of an assemblage of refractory bricks mechanically interlocked together from the inner to the outer sides of the wall, the bricks being disposed in superposed courses, those of one course breaking joint with those of adjacent courses, and fixed vertical standards near the outer side of the wall and interlocking with bricks of each course to prevent the wall from leaning or bending inward under action of heat at the inner side of the wall.

14. A refractory wall for high temperature furnaces, comprising adjacent courses of bricks forming a wall structure one side of which is adapted to be subjected to high melting temperatures, the bricks of each course being mechanically bonded to one another in a direction extending away from the side subjected to heat to obtain a horizontal interlock, and anchoring means comprising heat conducting standards extending into and interlocking with the bricks adjacent to the side opposite that subjected to the heat to produce a vertical interlock and anchoring the whole wall through the mechanical bonding together of the bricks of the courses.

In testimony whereof I affix my signature.

THOMAS S. CURTIS.